United States Patent
Zoppas et al.

(10) Patent No.: US 11,584,056 B2
(45) Date of Patent: Feb. 21, 2023

(54) INJECTION-COMPRESSION MOLDING DEVICE

(71) Applicant: S.I.P.A. SOCIETA' INDUSTRIALIZZAZIONE PROGETTAZIONE E AUTOMAZIONE S.P.A., Vittorio Veneto (IT)

(72) Inventors: Matteo Zoppas, Conegliano (IT); Alberto Armellin, Vittorio Veneto (IT); Kosuke Tamura, Cross Street Exchange (SG); Kazuya Fujihara, Tokyo (JP); Yosuke Fujihara, Tokyo (JP)

(73) Assignee: S.I.P.A. SOCIETA' INDUSTRIALIZZAZIONE PROGETTAZIONE E AUTOMAZIONE S.P.A., Vittorio Veneto (IT)

( * ) Notice: Subject to any disclaimer, the term of this patent is extended or adjusted under 35 U.S.C. 154(b) by 0 days.

(21) Appl. No.: 16/769,032

(22) PCT Filed: Dec. 4, 2018

(86) PCT No.: PCT/IB2018/059619
§ 371 (c)(1),
(2) Date: Jun. 2, 2020

(87) PCT Pub. No.: WO2019/111149
PCT Pub. Date: Jun. 13, 2019

(65) Prior Publication Data
US 2021/0221039 A1  Jul. 22, 2021

(30) Foreign Application Priority Data
Dec. 6, 2017  (IT) .................. 102017000140880

(51) Int. Cl.
*B29C 45/56* (2006.01)
*B29B 11/08* (2006.01)
(Continued)

(52) U.S. Cl.
CPC ............ *B29C 45/561* (2013.01); *B29B 11/08* (2013.01); *B29B 11/12* (2013.01); *B29C 45/36* (2013.01);
(Continued)

(58) Field of Classification Search
CPC . B29C 45/561; B29C 45/36; B29C 2045/363; B29C 2045/5645;
(Continued)

(56) References Cited

U.S. PATENT DOCUMENTS 3,245,706 A * 4/1966 Rowlett .............. F16C 11/0604
403/135
3,765,706 A * 10/1973 Bram ...................... F16L 21/04
285/231
(Continued)

FOREIGN PATENT DOCUMENTS

CN  204183076 U  3/2015
JP  2001079898 A  * 3/2001

*Primary Examiner* — Jacob T Minskey
*Assistant Examiner* — Caroline Beha
(74) *Attorney, Agent, or Firm* — Amster Rothstein & Ebenstein LLP

(57) ABSTRACT

An injection-compression molding device (1), wherein the rod (3) and the core (5) are connected to each other by means of a joint (20) which allows to have a rigid connection in some steps of an injection-compression molding process, and an articulated connection during the compression step of the injection-compression molding process.

18 Claims, 13 Drawing Sheets

(51) Int. Cl.
*B29B 11/12* (2006.01)
*B29C 45/36* (2006.01)
*B29K 67/00* (2006.01)

(52) U.S. Cl.
CPC    *B29C 2045/363* (2013.01); *B29C 2045/5645* (2013.01); *B29K 2067/003* (2013.01)

(58) Field of Classification Search
CPC ........ B29C 2045/1768; B29C 45/1761; B29C 45/2602; B29C 45/2608; B29C 2045/565; B29C 45/4435; B29C 2045/338; B29B 11/08; B29B 11/12; B29B 11/14; B29K 2067/003; B29K 2105/253
See application file for complete search history.

(56) References Cited

U.S. PATENT DOCUMENTS

| | | | |
|---|---|---|---|
| 3,950,119 A * | 4/1976 | Reichenbach | B29D 99/0053 425/127 |
| 6,412,822 B1 * | 7/2002 | Omiya | F16L 27/0828 277/937 |
| 2003/0040810 A1 * | 2/2003 | Molino | A61F 2/6607 623/52 |
| 2012/0183641 A1 * | 7/2012 | Shih | B29C 45/401 425/441 |
| 2015/0352763 A1 * | 12/2015 | Zoppas | B29C 45/02 264/39 |
| 2017/0320249 A1 * | 11/2017 | Wieder | B29C 45/26 |

* cited by examiner

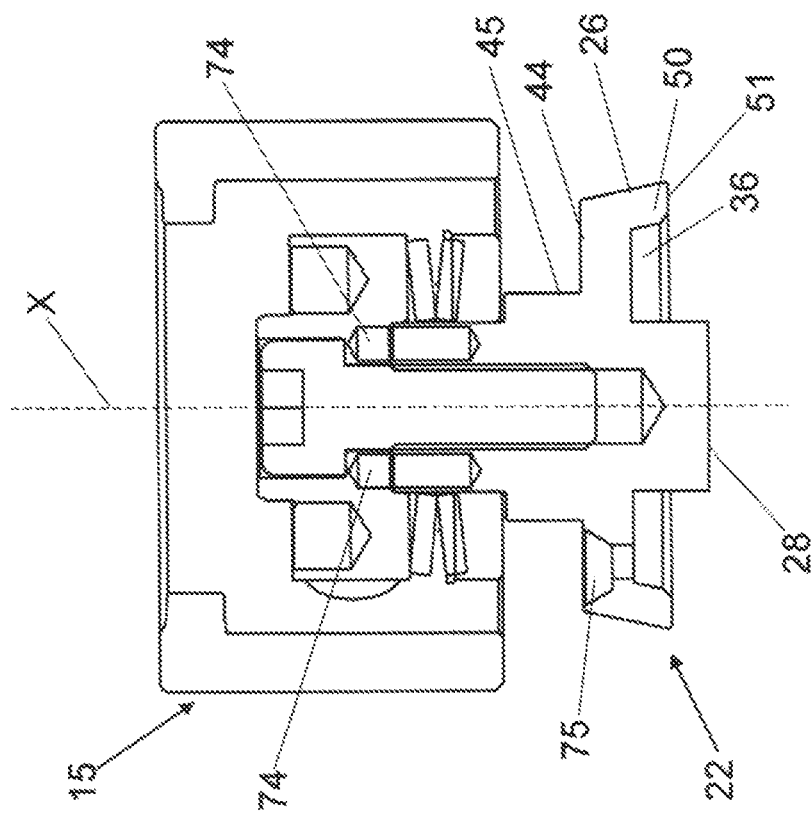
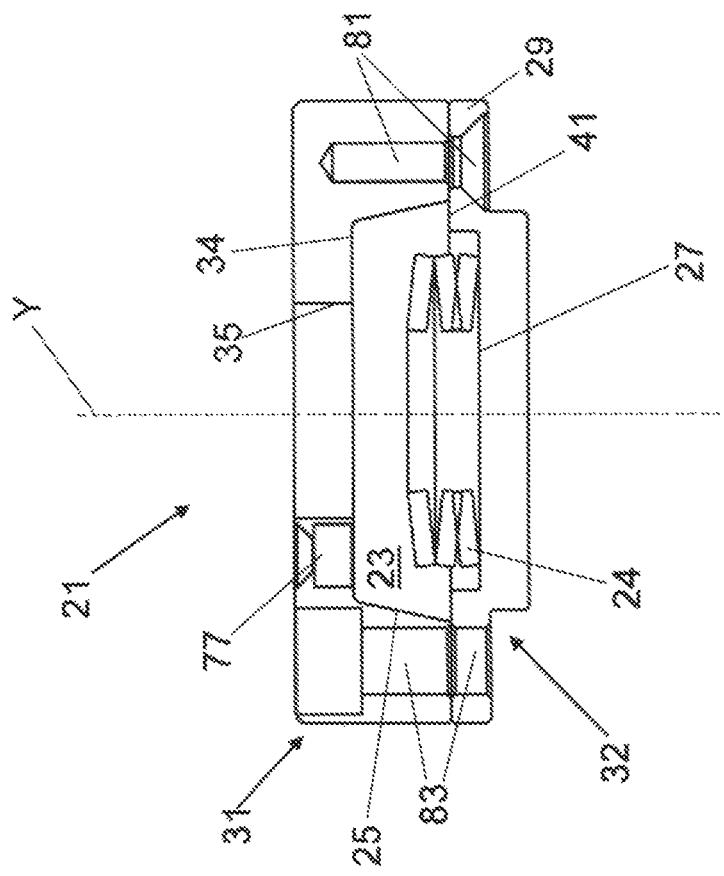

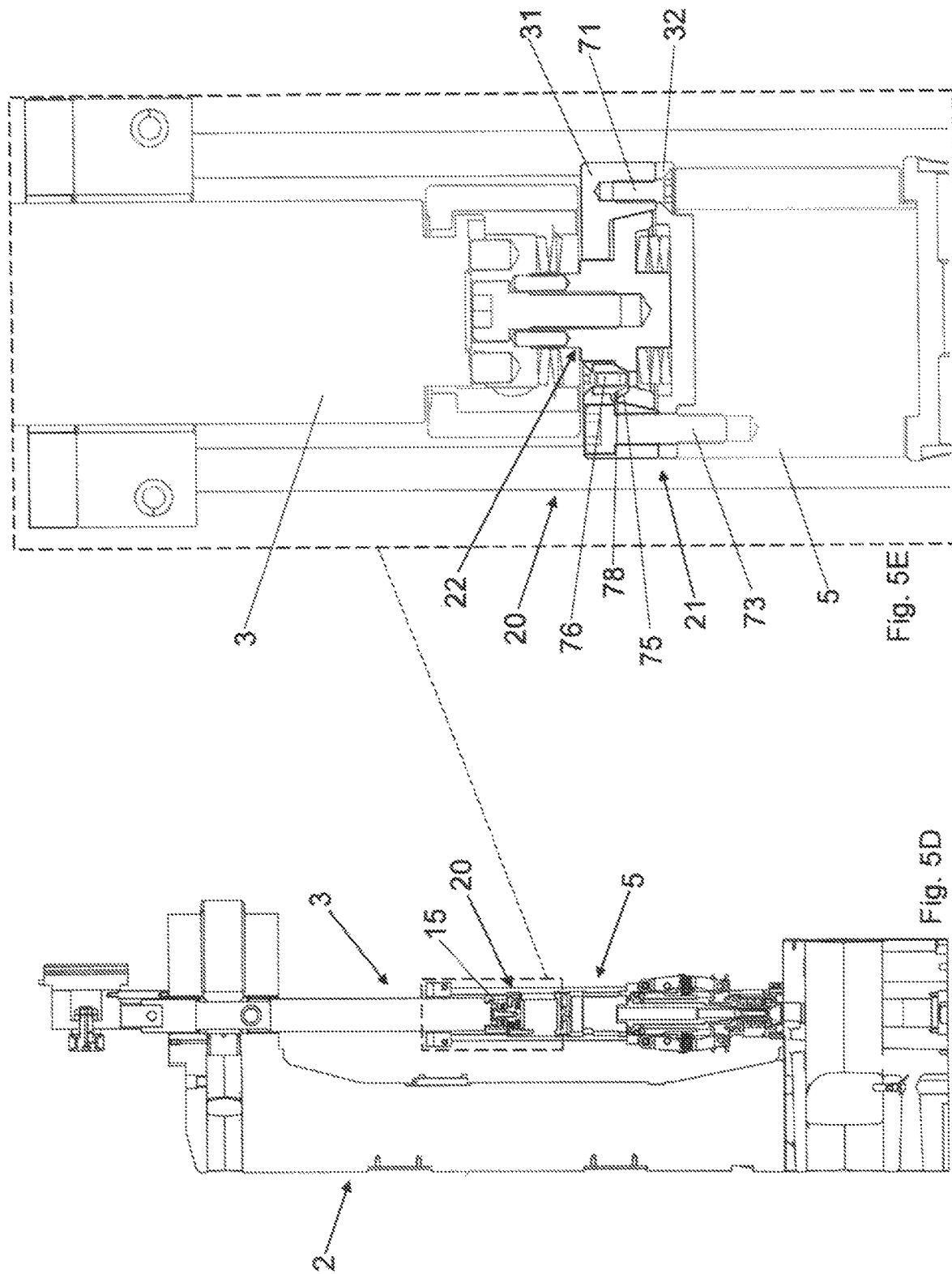

INJECTION-COMPRESSION MOLDING DEVICE

CROSS REFERENCE TO RELATED APPLICATION

This application claims benefit under 35 U.S.C. § 371 to international application No. PCT/IB2018/059619 filed on Dec. 4, 2018, which claims priority to Italian application No. IT 102017000140880 filed Dec. 6, 2017, the contents of which are incorporated by reference in their entireties.

FIELD OF THE INVENTION

The present invention relates to an injection-compression molding device for producing bottle preforms made of thermoplastic material, e.g. PET.

BACKGROUND ART

Bottle preforms made of thermoplastic material are typically produced by means of an injection molding process.

Another preform production process, referred to as injection-compression molding, has been emerging in recent years.

In an injection-compression molding process, a mold closing step, an injection step and a compression step are provided for.

A mold closing force is applied during the mold closing step.

During the injection step, a predetermined amount of molten plastic is injected into the mold.

During the compression step, a compression force is applied to complete the molding of the preform.

A molding device for producing preforms by means of injection-compression molding, diagrammatically shown in FIG. 1, typically comprises a frame 2, a rod 3, a molding cavity 4 and a core 5. The core 5 is rigidly fixed to an end of the rod 3.

The frame 2 comprises a central part which extends between an upper and a lower part. The upper part and the lower part are cantilevered with respect to the central part. In particular, the frame 2 is substantially "C"-shaped.

The rod 3, or shaft, is inserted into a guide hole of the upper part of the frame 2 so that it can slide with respect to the upper part of the frame 2.

The molding cavity 4, also referred to as a female mold, defines the outer shape of the preform, and is rigidly fixed to the lower part of the frame 2.

The core 5, also known as the male part of the mold, comprises an end part, which defines the inner shape of the preform.

The molding cavity 4 and the core 5, in particular the end part thereof, are mutually complementary components and together form the mold of the preform.

During the preform molding, the core 5 is inserted into the molding cavity 4 so as to close the mold.

In order to obtain a good-quality preform, in particular without concentricity errors, the core 5 should always be perfectly centered in the molding cavity 4. This ideal condition is diagrammatically shown in FIG. 1. In particular, the longitudinal axis of the core 5 should coincide with the longitudinal axis of the molding cavity 4.

For a known molding device, this condition may only occur when no closing force or tonnage is applied.

Actually, it can happen that the preforms are produced with a certain concentricity error.

Indeed, a closing force, e.g. from 1 to 3 tons for each core 5—molding cavity 4 pair, is applied before the compression step. This closing force is transferred to the frame 2, which thus undergoes a deformation, as shown in FIG. 2. In particular, a relative inclination occurs between the upper part and the lower part of the frame 2, or in other words there is an "opening" of the C shape of the frame 2.

The deformation of the frame 2 results, in turn, in a relative inclination, or rotation, of the core 5 with respect to the molding cavity 4.

In FIG. 2, the angle which is formed between the longitudinal axes of the core 5 and of the molding cavity 4 is indicated by reference "δ". This angle δ substantially corresponds to the opening angle of the frame 2. The inclination of the core 5 with respect to molding cavity 4 causes a concentricity error of the molded preform. The concentricity error is indicated by reference "ε" in FIG. 2.

It is worth noting that FIG. 2 is diagrammatic. In particular, for illustration purposes, in FIG. 2 the amount of the inclination of rod 3 and core 5, as well as the width of the opening angle δ and concentricity error ε, was depicted in an emphasized manner with respect to a possible real situation.

The effect of the deformation of the frame and the consequences resulting therefrom are all the more pronounced the greater the number of core-mold pairs which form part of the same molding device, in particular which are constrained to the same frame.

For example, a molding device which comprises three molding cavities, in which a closing force of 2 tons per molding cavity is applied, will be subjected to a total closing force equal to 6 tons. In this case, the width of the angle δ is equal to about 0.1° and the concentricity error ε is about 0.3 mm.

Therefore, the need to overcome the disadvantages of the prior art is felt.

SUMMARY OF THE INVENTION

It is an object of the present invention to provide an injection-compression molding device for producing bottle preforms which allows to minimize the concentricity error of the molded preforms.

For this purpose, an injection-compression molding device for producing bottle preforms is provided, which comprises
  a frame;
  at least one molding cavity fixed to the frame;
  at least one rod, connected to the frame so as to be capable of sliding with respect thereto;
  at least one core, connected to the at least one rod so as to be capable of sliding therewith, adapted to be inserted into the at least one molding cavity defining a mold;
  actuation means adapted to exert a mold closing force when the at least one core is inserted into the at least one molding cavity;
  wherein a joint connecting the at least one core to the at least one rod is provided, wherein said joint comprises
  a first part, integrally connected to and coaxial with said at least one core and defining a cavity;
  a second part, integrally connected to and coaxial with said at least one rod and at least partially capable of sliding in said cavity when the closing force is applied;
  elastic means arranged in said cavity;
  said first part being provided with an inner side surface;
  said second part being provided with an outer side surface;

wherein, in a first configuration of the joint, in the absence of the closing force, the outer side surface is kept in contact with the inner side surface, by the bias of said elastic means, so that the at least one rod and the at least one core are kept mutually coaxial;

and wherein, in a second configuration of the joint, in the presence of the closing force, a clearance is provided between the outer side surface and the inner side surface, said elastic means being pressed by said second part, so that the at least one rod is adapted to rotate with respect to the core.

In particular, the actuation means apply the aforesaid closing force, or more generally a force, on the at least one rod when the at least one core is inserted into the respective molding cavity. The closing force is also referred to as a tonnage.

These actuation means are preferably pneumatic, e.g. a pneumatic cylinder.

The mold is formed by the molding cavity and the core, in particular the end part thereof.

Advantageously, the joint allows to have a rigid connection between the rod and the core in some steps of the molding process, and an articulated connection between the rod and the core when the mold closing force is applied and during the compression step. In particular, the mold closing force causes a relative movement, in particular a translation, between the first part and the second part of the joint, whereby there is a yoke between said first part and said second part of the joint, which allows a mutual inclination thereof.

When the rod and the core are rigidly connected, i.e. in the absence of the mold closing force, they are also coaxial with each other and with the molding cavity, i.e. their longitudinal axes substantially coincide. Therefore, a correct insertion of the core into the molding cavity, and also a correct removal of the core, and therefore of the molded preform from the molding cavity, is provided.

When the rod and the core are connected in an articulated manner, the rod and core can be mutually inclined. In particular, when there is a deformation of the frame due to the mold closing force, the rod and core can be mutually inclined so as to compensate for the misalignment error between the core and the molding cavity. This minimizes the concentricity error of the molded preform.

On the other hand, in the devices of the prior art, the rod and the core are always rigidly connected to each other, and therefore always aligned with each other. As explained above, due to the deformation of the frame during the application of the mold closing force, in the devices of the prior art, when the closing force is applied and during the compression step, the rod and core are aligned with each other but are not aligned with the molding cavity, so that the concentricity error of the preform is quite significant.

Further features and advantages of the present invention will become more apparent from the detailed description of some exemplificative, but not exclusive embodiments.

The dependent claims describe particular embodiments of the invention.

BRIEF DESCRIPTION OF THE DRAWINGS

The description of the invention refers to the accompanying drawings, which are provided by way of non-limiting example, in which:

FIG. 5B shows a section view of a component of the joint in FIG. 5A, rotated about axis Y with respect to FIG. 5A;

FIG. 5C shows a section view of another component of the joint in FIG. 5A, rotated about axis Y with respect to FIG. 5A;

FIG. 5D shows a section view of a molding device according to the invention;

FIG. 5E shows a detail of FIG. 5D;

The same references in the figures identify the same elements or components or mutually similar elements or components.

DESCRIPTION OF EXEMPLARY EMBODIMENTS OF THE INVENTION

Figure 2:
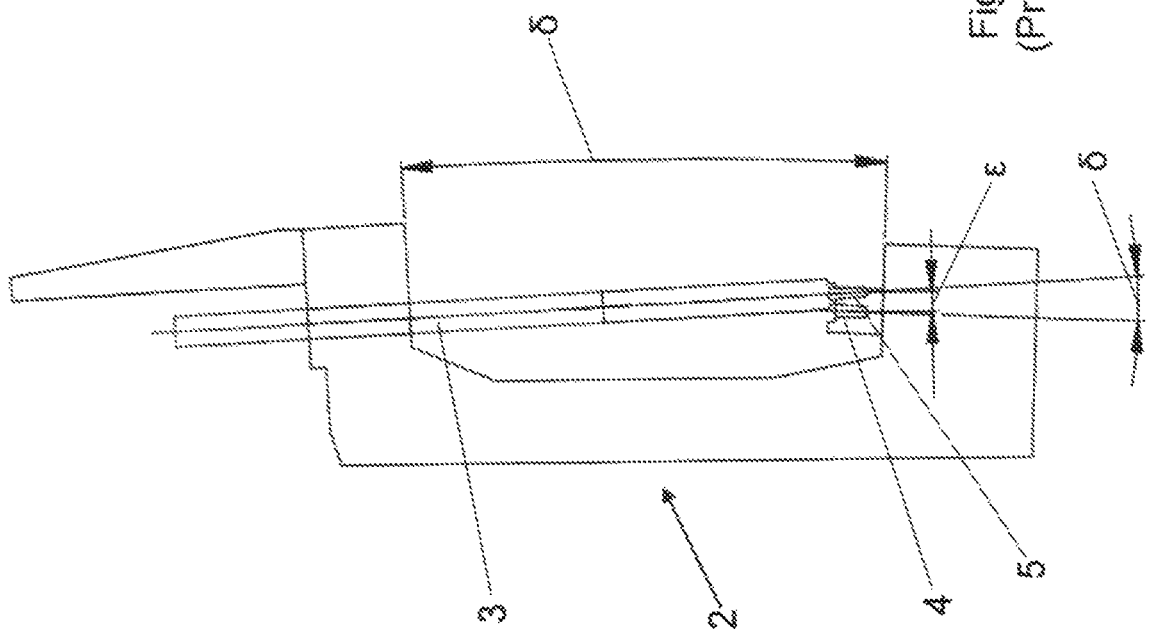
FIG. 2 diagrammatically illustrates the device in FIG. 1 during another step of the molding process.
Figure 1:
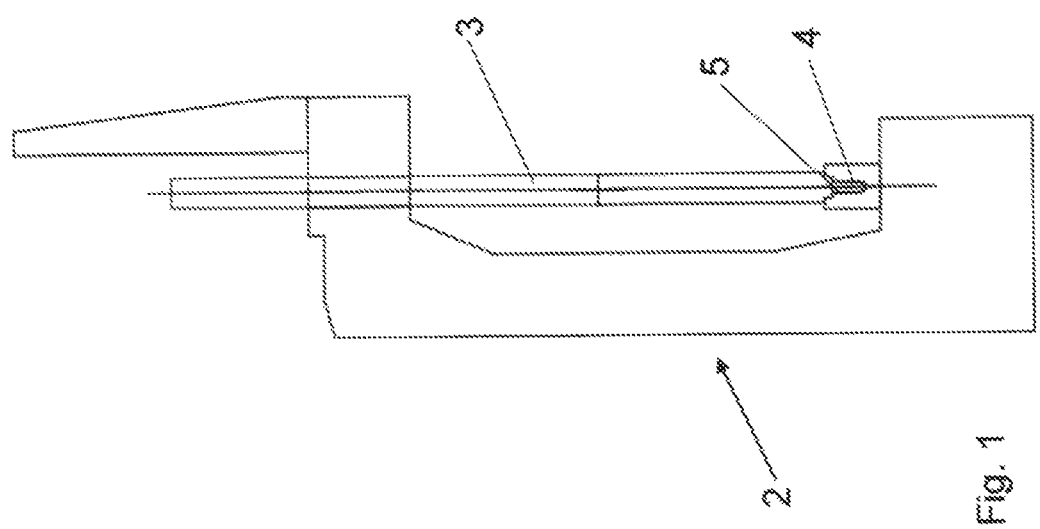
FIG. 1 diagrammatically illustrates a molding device according to the prior art during a step of the molding process.

An injection-compression molding device 1 for producing bottle preforms is shown with reference to the figures.

The molding device 1 generally comprises:

a frame 2;

at least one molding cavity 4 fixed to the frame 2;

at least one rod 3, connected to the frame 2 so as to be capable of sliding with respect thereto;

at least one core 5, connected to the at least one rod 3 so as to be capable of sliding therewith, adapted to be inserted into the at least one molding cavity 4 defining a mold;

actuation means adapted to apply a mold closing force when the at least one core 5 is inserted into the at least one molding cavity 4;

wherein a joint 20 connecting the at least one core 5 to the at least one rod 3 is provided, wherein said joint 20 comprises a first part 21, integrally connected to and coaxial with said at least one core 5 and defining a cavity 23;

a second part 22, integrally connected to and coaxial with said at least one rod 3 and at least partially capable of sliding in said cavity 23 when the closing force is applied;

elastic means 24 arranged in said cavity 23;

said first part 21 being provided with an inner side surface 25;

said second part 22 being provided with an outer side surface 26;

wherein, in a first configuration of the joint 20, in the absence of the closing force, the outer side surface 26 is kept in contact with the inner side surface 25, by the bias of said elastic means 24, so that the at least one rod 3 and the at least one core 5 are kept mutually coaxial;

and wherein, in a second configuration of the joint 20, in the presence of the closing force, a clearance is provided between the outer side surface 26 and the inner side surface 25, said elastic means 24 being pressed by said second part 22, so that the at least one rod 3 is adapted to rotate with respect to the core 5.

In particular, the actuation means apply the aforesaid closing force, or more generally a force, on at least one rod when the at least one core is inserted into the respective molding cavity.

The actuation means are preferably pneumatic, e.g. a pneumatic cylinder. Additional actuation means are also provided to apply a compression force.

The frame 2 comprises a central part 6, which extends between an upper part 7 and a lower part 8. The upper part 7 and the lower part 8 are cantilevered with respect to the central part 6 and face each other. In particular, the upper part 7 and the lower part 8 extend transversely from two end portions of the central part 6. So, the frame 2 is substantially "C"-shaped.

The molding cavity 4, also referred to as a female mold, defines the outer shape of the preform and is rigidly fixed to the lower part 8 of the frame 2.

The core 5, also known as the male part of the mold, comprises an end part, which defines the inner shape of the preform.

The molding cavity 4 and the core 5, in particular the end part thereof, are mutually complementary components and together form the mold of the preform.

During the preform molding, the core 5 is inserted into the molding cavity 4 so as to close the mold.

The molding cavity 4 is delimited by the inner walls of a block 14. The block 14 is integrally fixed to an upper surface of the lower part 8 of frame 2. The molding cavity 4 has an opening which faces towards the upper part 7 of frame 2. The device 1, in particular the frame 2, may have one or more molding cavities 4, e.g. one, two or three molding cavities. Preferably, there are three molding cavities. The blocks are arranged according to a predetermined pitch, or pattern, and are preferably arranged along a circumference.

A respective rod 3, defining a longitudinal axis X, and a respective core 5, defining a longitudinal axis Y, are provided for each molding cavity 4.

In other words, the number of molding cavities 4 corresponds to the number of rods 3 and cores 5.

When two or more molding cavities 4 are provided, the rods 3 are arranged according to the same pitch, or pattern, as the molding cavities 4, so that each core 5 can be inserted into a respective molding cavity 4.

Each rod 3 is inserted into a respective hole, or guide hole, in the upper part 7 of frame 2. Each rod 3, actuated by actuation means, can thus slide with respect to the frame 2, being guided by the guide hole.

The joint 20 which connects each rod 3 to the respective core 5 allows to have a rigid connection between rod 3 and core 5 in some steps of the preform molding process, and an articulated, i.e. non-rigid, connection between rod 3 and core 5, in particular when the mold closing force is applied and during the compression step of the injection-compression molding process.

Figure 5A:
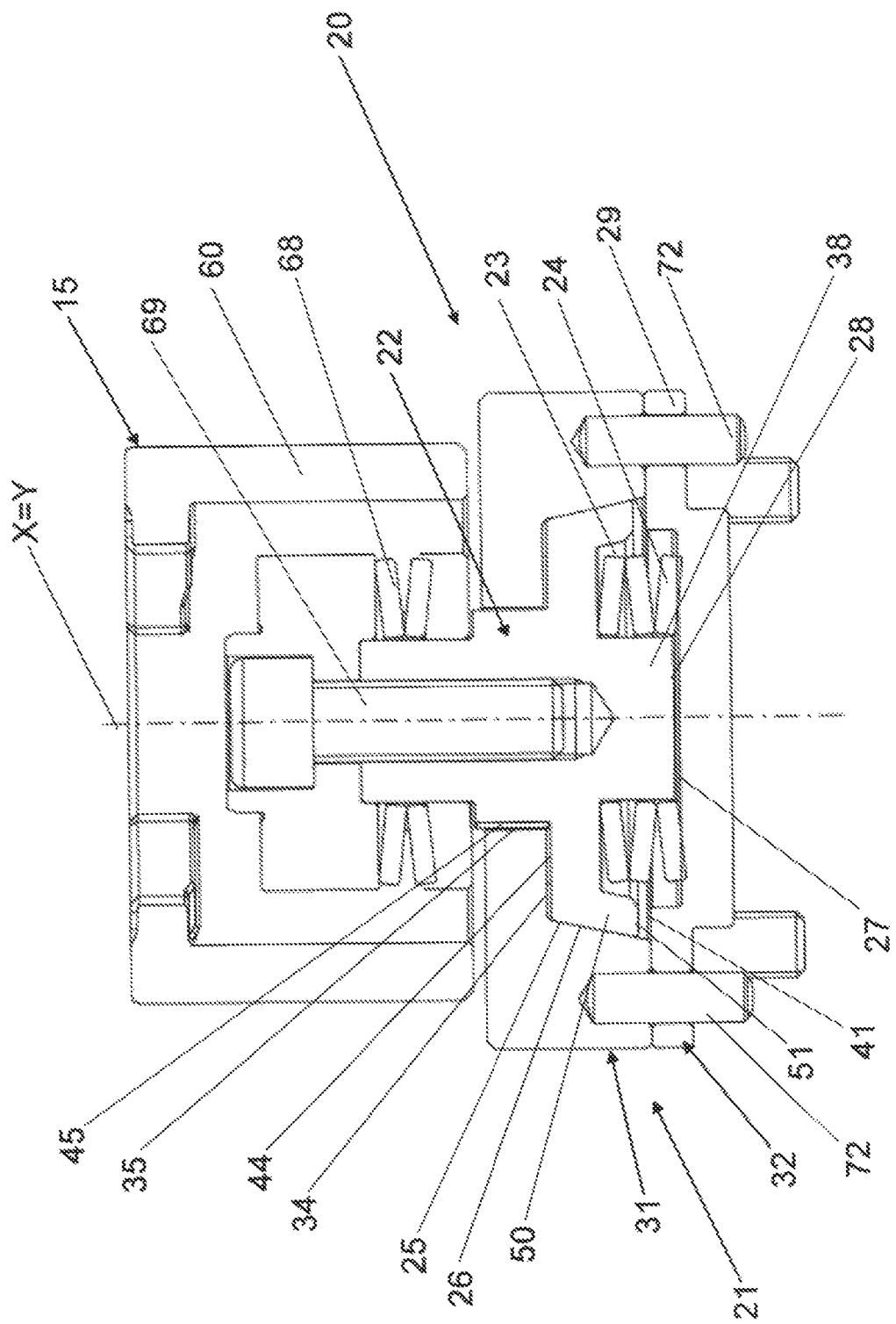
FIG. 5A shows a section view of a joint according to an embodiment of the invention.

With particular reference to FIG. 5A, FIG. 5B and FIG. 5E, the first part 21 of the joint 20 defines a central axis, which substantially coincides with the longitudinal axis Y of the core 5, to which the first part 21 is connected.

The first part 21 of the joint 20 comprises a first body, or upper body 31, and a second body, or lower body 32.

The upper body 31 and lower body 32 are integrally fixed by means of fastening means. For example, the upper body 31 and lower body 32 are fixed to each other by means of fastening screws 71 (FIG. 5E), also referred to as first fastening screws, inserted into the upper body 31 and into the lower body 32. One of the fastening screws 71 is shown in FIG. 5E, while the respective housing 81, partially defined by the upper body 31 and partially by the lower body 32, is shown in FIG. 5B. FIGS. 5B and 5E are rotated around the axis Y with respect to FIG. 5A.

Additional fastening screws 73 (FIG. 5E) are also provided, also referred to as second fastening screws, which are used to fix the first part 21 of the joint 20 to the structure of the core 5. The second fastening screws 73 cross the upper body 31 and lower body 32 and protrude below from the lower body 32 so as to be inserted and fixed into the structure of the core 5. One of the fastening screws 73 is shown in FIG. 5E, while FIG. 5B shows the part of the respective housing 83 which is defined by the upper body 31 and the lower body 32.

Preferably, centering pins 72 (FIG. 5A) are also provided, which are inserted into the upper body 31 and into the lower body 32. The centering pins 72 protrude below from the lower body 32 and are also inserted into the structure of core 5.

The first fastening screws 71, the second fastening screws 73 and the centering pins 72 are preferably inserted into a flange, or peripheral portion 29 of the lower body 32 and in a flange, or peripheral portion, of the upper body 31. Preferably, the first fastening screws 71, the second fastening screws 73 and the centering pins 72 are distributed according to a substantially circular pattern.

With particular reference to FIGS. 5A and 5B, the upper body 31 has a wall or inner surface which comprises a frustoconical surface 25 and a cylindrical surface 35, coaxial with the frustoconical surface 25. The cylindrical surface 35 is proximal with respect to the rod 3 and the frustoconical surface 25 is distal with respect to the rod 3. The cylindrical surface 35 delimits an opening of the upper body 31. The frustoconical surface 25 is tapered upwards, i.e. towards the rod 3. Preferably, the taper angle of the frustoconical surface 25, i.e. the angle that the frustoconical surface 25 forms with respect to the axis Y, is equal to a value between 10° and 30°, the extreme values being preferably included.

The diameter of the cylindrical surface 35 is smaller than the minimum diameter of the frustoconical surface 25. The cylindrical surface 35 and the frustoconical surface 25 are connected by a surface 34 which preferably is substantially orthogonal to the cylindrical surface 35. The surface 34, viewed on a plane perpendicular to the axis Y, is substantially a circular crown.

With particular reference to FIGS. 5A and 5C, the second part 22 of the joint 20 is preferably formed by a single body. The second part 22 defines a central axis, which substantially coincides with the longitudinal axis X of the rod 3. The second part 22 delimits a housing inside, preferably at the center, in which a screw 69 (FIG. 5A) is inserted by means of which the second part 22 is integrally fixed to the rod 3. In particular, the screw 69 fixes the second part 22 to a coupling (or connection body), preferably a bayonet coupling 15, to which the rod 3 is connected. The bayonet coupling 15 will be described in more detail below. Centering pins 74 (FIG. 5C), which are inserted into a portion of the bayonet coupling 15 and in the second part 22 of the joint 20, are preferably provided around the screw 69. The lower part of the bayonet coupling 15 is preferably spaced apart from the upper surface of the upper body 31 of the first part of the joint 20, so that there is a clearance between the bayonet coupling 15 and the upper body 31 (FIG. 5A).

The second part 22 of the joint 20 comprises surfaces 26, 44, 45, which are respectively similar in shape and which respectively face the frustoconical surface 25, the cylindrical surface 35 and the surface 34 of the first part 21 of the joint 20.

In particular, the outer wall or surface of the second part 22 comprises a frustoconical surface 26 and a cylindrical surface 45, coaxial to the frustoconical surface 26. The cylindrical surface 45 is proximal with respect to the rod 3 and the frustoconical surface 26 is distal with respect to the rod 3. The frustoconical surface 26 is tapered upwards, i.e. towards the rod 3. Preferably, the taper angle of the frustoconical surface 26, i.e. the angle that the frustoconical surface 26 forms with respect to the axis X, is equal to the taper angle of the frustoconical surface 25 with respect to the axis Y.

The diameter of the cylindrical surface 45 is smaller than the minimum diameter of the frustoconical surface 26. The cylindrical surface 45 and the frustoconical surface 26 are connected by a surface 44 which preferably is substantially orthogonal to the cylindrical surface 45. The surface 44, viewed on a plane perpendicular to the axis X, is substantially a circular crown. Preferably, the surface 44 further comprises a plurality of recesses 75, one of which is shown in FIGS. 5C and 5E, preferably arranged according to a circular pattern. A corresponding through hole 77 (FIG. 5B) of the first part 21 of the joint 20 is provided at each recess 75 of the second part 22 of the joint 20, in particular obtained in the upper body 31. A respective pin 76 (FIG. 5E) or a respective screw, which crosses a portion of the upper body 31, is inserted into such recesses 75. Therefore, the rotation about the axis X or Y is prevented, or at least an excessive rotation is prevented, between the first part 21 and the second part 22 of the joint 20. Preferably, the width of the recesses 75 is wider than the width of the pin portion 76, said pin portion being preferably shaped as a wedge 78 (FIG. 5E), accommodated in recess 75. Therefore, the inclination of the second part 22 of the joint 20 with respect to the first part 21 is not hindered. Preferably, the wedge 78 is an element fixed to a pin portion 76.

With particular reference to FIG. 5A, the frustoconical surface 26 is surrounded by the frustoconical surface 25; the cylindrical surface 45 is surrounded by the cylindrical surface 35; and the surface 44 faces the surface 34, in particular is under the surface 34.

The outer diameter of the cylindrical surface 45 is smaller than the inner diameter of the cylindrical surface 35, so that there is a clearance between the cylindrical surface 45 and the cylindrical surface 35.

The height of the frustoconical surface 26 is lower than the height of the frustoconical surface 25. In particular, these heights may be considered along the longitudinal axis X or along the longitudinal axis Y, in the first configuration of the joint 20, in which these axes coincide.

The elastic means 24 of the joint 20 are at least partially or completely arranged between the second part 22 of the joint 20 and the lower body 32 of the first part 21 of the joint 20. Preferably, but not exclusively, the elastic means 24 can be either a spring, e.g. a Belleville washer, elastomeric means, e.g. one or more elastomeric rings, or pneumatic elastic means, e.g. an air spring.

Figure 3:
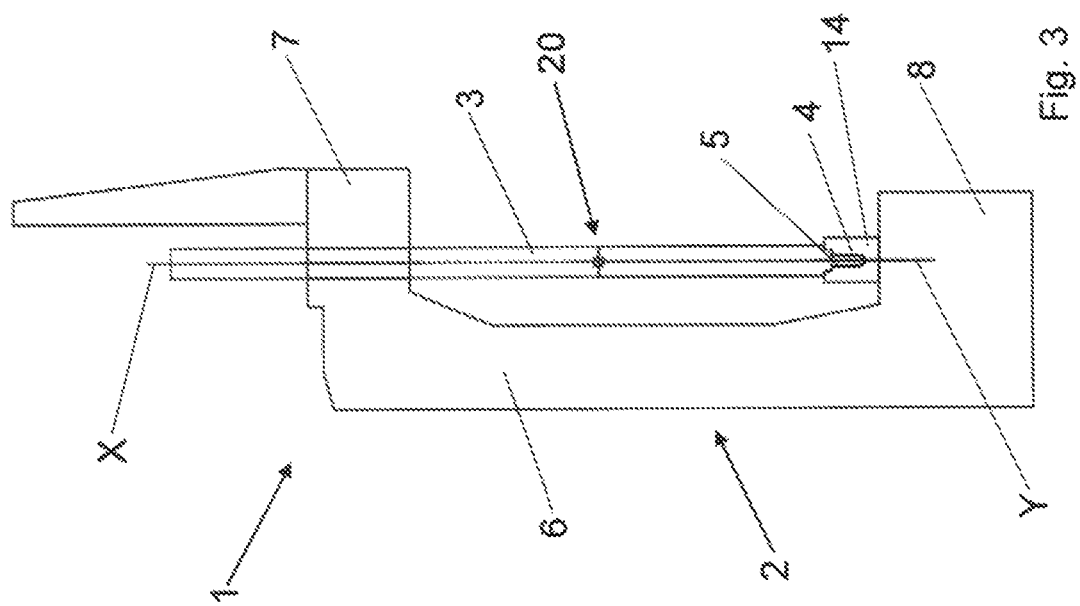
FIG. 3 diagrammatically illustrates a molding device according to the invention during a step of the molding process.

FIG. 3 diagrammatically shows the molding device 1 when the joint 20 is in its first configuration. The first configuration of joint 20 is also visible in FIG. 5F. In the first configuration of the joint 20, which occurs when the mold closing force is not applied, before the injection-compression molding process, the elastic means 24 apply an elastic force on the second part 22 of the joint 20. In particular, the elastic means 24 push the second part 22 upwards, i.e. towards the upper body 31 of the first part 21 of the joint 20. The frustoconical surface 26 is kept in contact with the frustoconical surface 25 by means of the elastic means 24. Preferably, the entire frustoconical surface 26 is kept in contact with the entire frustoconical surface 25. In the first configuration, the frustoconical surface 26 is coaxial with the frustoconical surface 25, so that the rod 3 and the core 5 are kept mutually aligned, i.e. with their respective longitudinal axes X and Y coinciding. In particular, in the first configuration, the frustoconical surface 25 defines a central axis coinciding with the longitudinal axis Y of the core 5, and the frustoconical surface 26 defines a central axis coinciding with the longitudinal axis X of the core 3. In the first configuration, the frustoconical surface 25 and the frustoconical surface 26 are parallel and mutually coaxial.

Preferably, in the first configuration, the surface 44 is spaced apart from the surface 34.

The second configuration of the joint 20 (FIG. 4 and FIG. 5H) occurs when the mold closing force is applied, by appropriate actuation means, before the injection-compression molding process. Preferably, such a mold closing force is applied by the actuation means on the rod 3. In the second configuration, the second part 22, pushed downwards by the rod 3, applies a force on the elastic means 24. The mold closing force is greater than the elastic force of the elastic elements 24. Therefore, the elastic means 24 are compressed and the second part 22 slides downwards, i.e. towards the lower body 32 of the first part 21 of the joint 20. Since the height of the frustoconical surface 26 is less than the height of the frustoconical surface 25, a clearance is created between the two frustoconical surfaces 25, 26. In other words, the frustoconical surfaces 25, 26 can mutually incline, and so can their central axes. Furthermore, since a clearance is provided between the cylindrical surface 35 and the cylindrical surface 45, the rod 3 can rotate with respect to the core 5, or in other words it can be inclined with respect to the core 5.

The rotation is such that an angle other than zero is formed between the axis X of the rod 3 and the axis Y of the core 5. Preferably, the angle which is formed is between 0° and 2°, preferably between 0.05° and 0.5°, e.g. about 0.1°, the extreme values of said intervals being preferably included.

Figure 4:
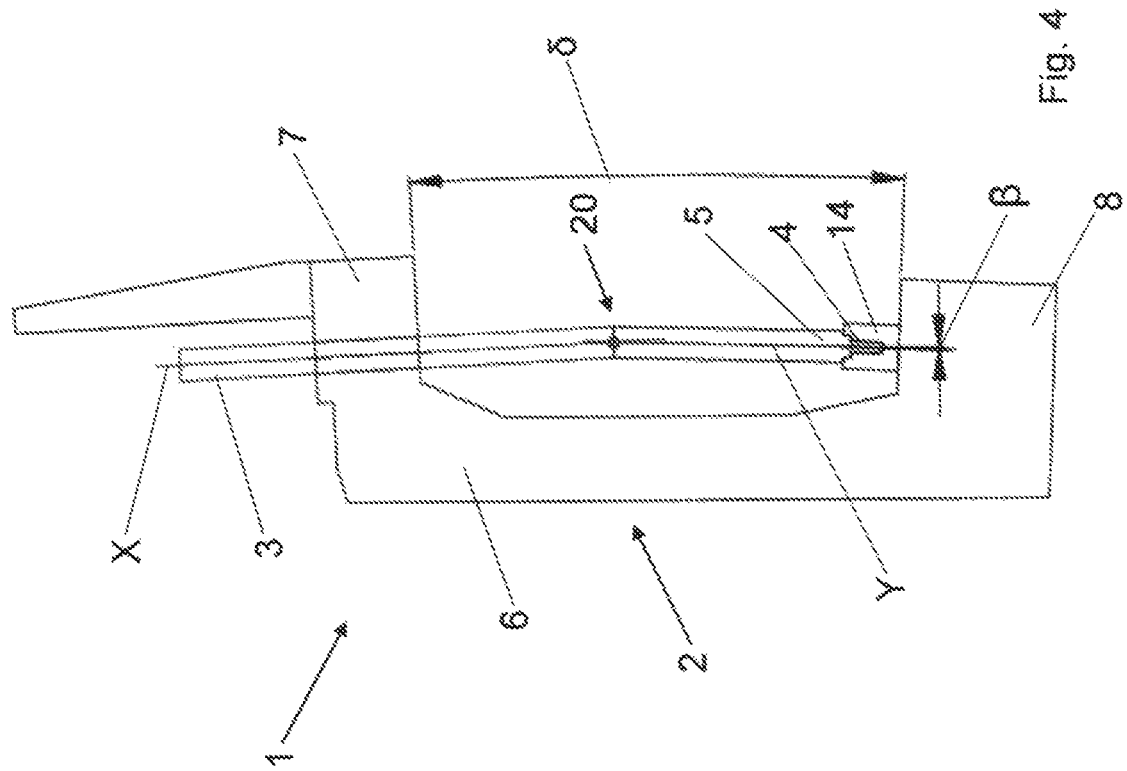
FIG. 4 diagrammatically illustrates the device in FIG. 3 during another step of the molding process.

By comparing FIG. 2 (prior art) and FIG. 4 (second configuration of the joint according to the invention), it can be noted that the opening angle $\delta$ of the frame 2 being the same, the concentricity error $\beta$ of the molded preform is much less than the concentricity error $\varepsilon$ of the device according to the prior art It is worth noting that FIG. 4 is diagrammatic. In particular, for illustration purposes, in FIG. 4 the width of the opening angle δ is depicted in an emphasized manner with respect to a possible real situation.

Preferably, the first part 21 of the joint 20 has a surface 27 facing towards a surface 28 of the second part 22 of the joint 20, and at least one between surface 27 and the surface 28 is curved, preferably with a radius of curvature from 10 to 500 mm. Preferably, in the first configuration of the joint 20, the minimum distance between the surface 28 and the surface 27 is equal to a value selected in the range from 0.1 to 5 mm, preferably either equal to or approximately equal to 0.6 mm.

In the second configuration, the surface 27 and the surface 28 cooperate, in particular are in contact, to mutually rotate the rod 3 and the core 5. The rotation is thus facilitated. Optionally, both the surface 27 and the surface 28 are curved and preferably have the same radius of curvature. The surface 27 and the surface 28 may have either equal or opposite concavity. For example, the surface 27 and the surface 28 may both have a concavity facing upwards, i.e. towards the rod 3; or the surface 27 and the surface 28 may both have a concavity facing downwards, i.e. towards the core 5; or the surface 27 may be concave upwards and the surface 28 can be concave downwards; or the surface 27 may be concave downwards and the surface 28 may be concave upwards. Alternatively, only either the surface 27 or the surface 28 is curved, while the other is flat. In this case, the concavity of the curved surface is towards the opposite side with respect to the flat surface. For example, if the surface 28 is curved and the surface 27 is flat, the concavity of the surface 28 is upwards.

The description provided so far applies to all variants of the invention.

A particular example of the embodiment described so far is provided below.

In the example shown in Figs. from 5A to 5H, the second part 22 of the joint 20 comprises a peripheral portion 50 and a lower central portion 38. The peripheral portion 50 comprises the frustoconical surface 26.

The elastic means 24 are preferably a Belleville washer. The Belleville washer 24 is arranged around the lower central portion 38. In particular, the Belleville washer 24 is partially arranged in an annular recess 36 (FIG. 5C) provided between the lower central portion 38 and the peripheral portion 50.

The Belleville washer 24 is on the upper side in contact with the second part 22 of the joint 20, and is in contact below with the lower body 32 of the first part 21 of the joint 20.

The lower central portion 38 has an outer side wall, preferably cylindrical. The outer diameter of the lower central portion 38 is smaller than the inner diameter of the peripheral portion 50. The lower central portion 38 protrudes underneath with respect to the peripheral portion 50 and, in particular, with respect to the frustoconical surface 26.

Figure 5H:
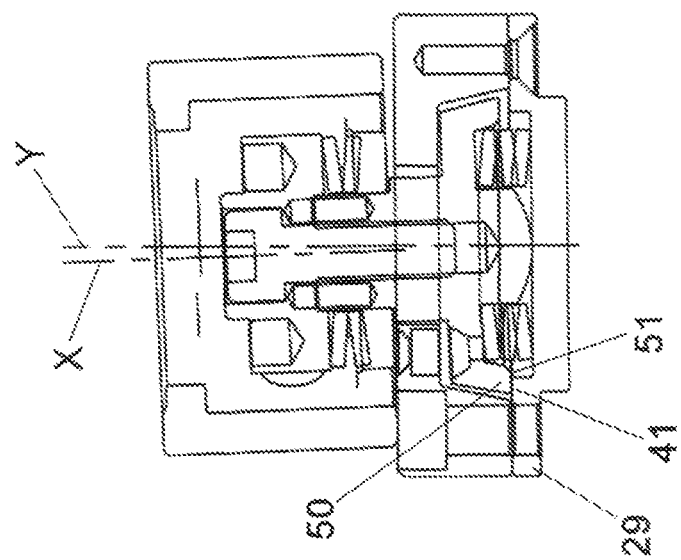
FIGS. 5F and 5H show section views of the joint in FIG. 5A in a first and a second configuration, respectively, in which some particulars are emphasized for illustration purposes.
Figure 5G:
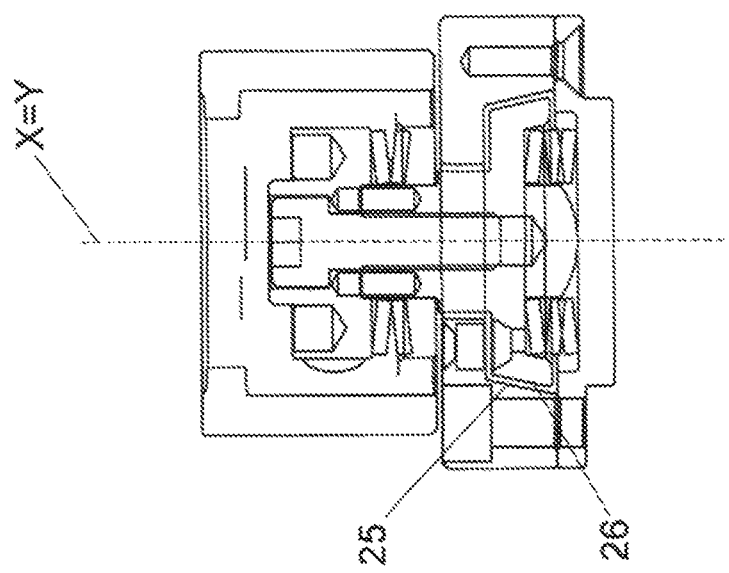
FIG. 5G shows a section view of the joint in FIG. 5A in an intermediate configuration with respect to FIGS. 5F and 5G, in which some particulars are emphasized for illustration purposes.
Figure 5F:
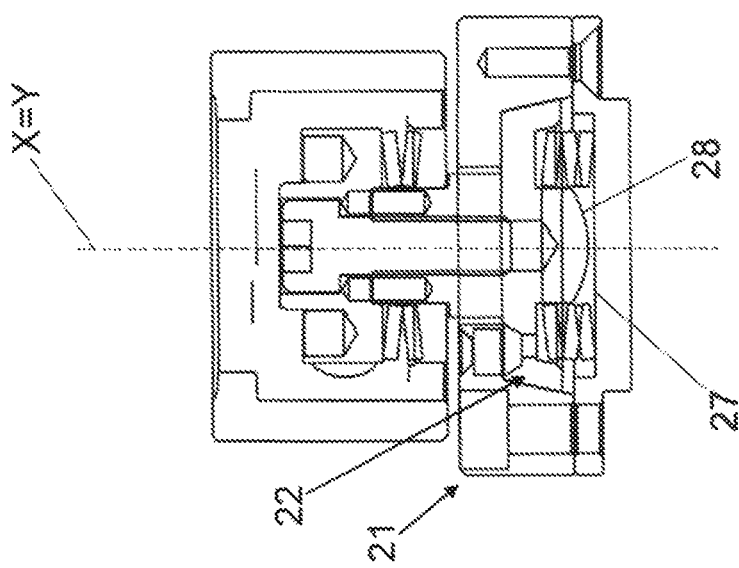

The lower central portion 38 has a lower surface 28 which is preferably curved, with upward concavity. In FIGS. 5F, 5G and 5H, the curvature of the surface 28 is emphasized for illustration purposes.

The lower body 32 has a surface, in particular a bottom surface 27, facing towards the lower surface 28. The bottom surface 27 is preferably flat. The bottom surface 27 is recessed with respect to the upper surface of the peripheral flange 29 of the lower body 32. The Belleville washer 24 is in contact below with such a bottom surface 27.

A clearance is provided between the second part of the joint 22 and upper surface 41 of the peripheral flange 29 of the second body 32. In particular, a clearance is provided between the lower surface 51 of the peripheral portion 50 and the upper surface 41 of peripheral flange 29.

In the first configuration of the joint 20, shown for example in FIG. 5F, the Belleville washer 24 is pre-compressed and pushes the second part 22 of the joint 20 upwards to keep the frustoconical surface 25 in contact with the frustoconical surface 26. Furthermore, in the first configuration, the lower surface 28 is spaced apart from the bottom surface 27. Preferably, the minimum distance between the lower surface 28 and the bottom surface 27 is equal to a value selected in the range from 0.1 to 5 mm, preferably either equal or approximately equal to 0.6 mm.

In FIGS. 5F, 5G and 5H, such a minimum distance is not in scale for illustration purposes.

FIG. 5H shows the second configuration of the joint 20, whilst FIG. 5G shows an intermediate configuration between the first and second configuration.

In the second configuration of the joint 20, the lower surface 28 is in contact with the bottom surface 27 to facilitate the inclination of the rod 3 with respect to the core 5. In particular, in the second configuration, the rod 3 and the core 5 can both rotate and translate with respect to each other. In FIG. 5H, it is worth noting that, in the second configuration, part of the lower surface 51 of the peripheral portion 50 may come into contact with part of the upper surface 41 of the peripheral flange 29, whilst on the opposite side the distance between the upper surface 41 and the lower surface 51 increases with respect to the first configuration of the joint 20.

Figure 6:
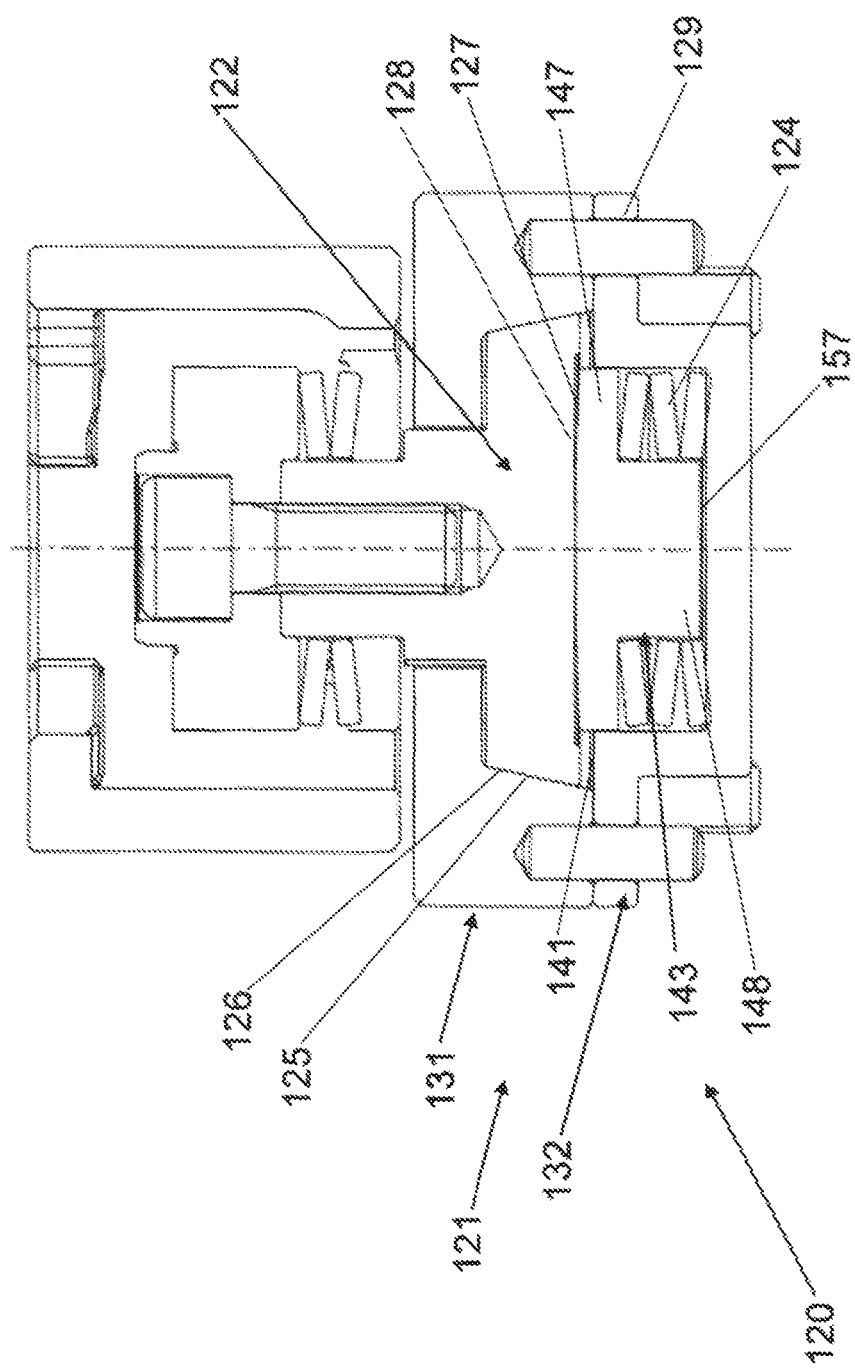
FIG. 6 shows a section view of a variant of the invention.

Several variants of the example of embodiment described so far is provided below. In a first variant, shown in FIG. 6, the first part 121 of the joint 120, in addition to the upper body 131 and to the lower body 132, also includes an additional body 143. The body 143 is arranged between the lower body 132 and the second part 122 of the joint 120. The body 143 has a flange 147 from which extends below a lower central portion 148, preferably having outer cylindrical side surface. The outer diameter of the flange 147 is greater than the outer diameter of the lower central portion 148.

The lower body 132 has a bottom surface 157 which is recessed with respect to the upper surface 141 of the peripheral flange 129 of the lower body 132.

The elastic means 124, which are preferably a Belleville washer, are in contact with the lower surface of the flange 147 and with the bottom surface 157 of the lower body 132, and are arranged around the lower central portion 148.

The upper surface 127 of the flange 147, which is the upper surface of the body 143, is at a higher height than the upper surface 141 of the peripheral flange 129. Furthermore, the upper surface 127 of the flange 147 is preferably always in contact with the central part of the lower surface 128 of the second part 122 of the joint 120. Instead, a clearance is provided between the peripheral part of the lower surface 128 and the upper surface 141 of the peripheral flange 129 of the lower body 132.

The lower surface 128 of the second part 122 of the joint 120 is preferably flat.

The upper surface 127 of body 143 is preferably curved, in particular concave downwards.

In the first configuration of the joint 120, the Belleville washer 124 is pre-compressed and pushes the body 143 upwards, which in turn pushes the second part 122 of the joint 120 upwards. Therefore, the contact between the frustoconical surface 125 and the frustoconical surface 126 is ensured.

In the second configuration of the joint 120, the lower surface 128 is in contact with the upper surface 127 to rotate the rod 3 with respect to the core 5. In particular, in the second configuration, the rod 3 and the core 5 can both rotate and translate with respect to each other. In this second configuration of the 120 joint, preferably only in this configuration, the body 143 abuts against the bottom surface 157 of the lower body 132.

Figure 7:
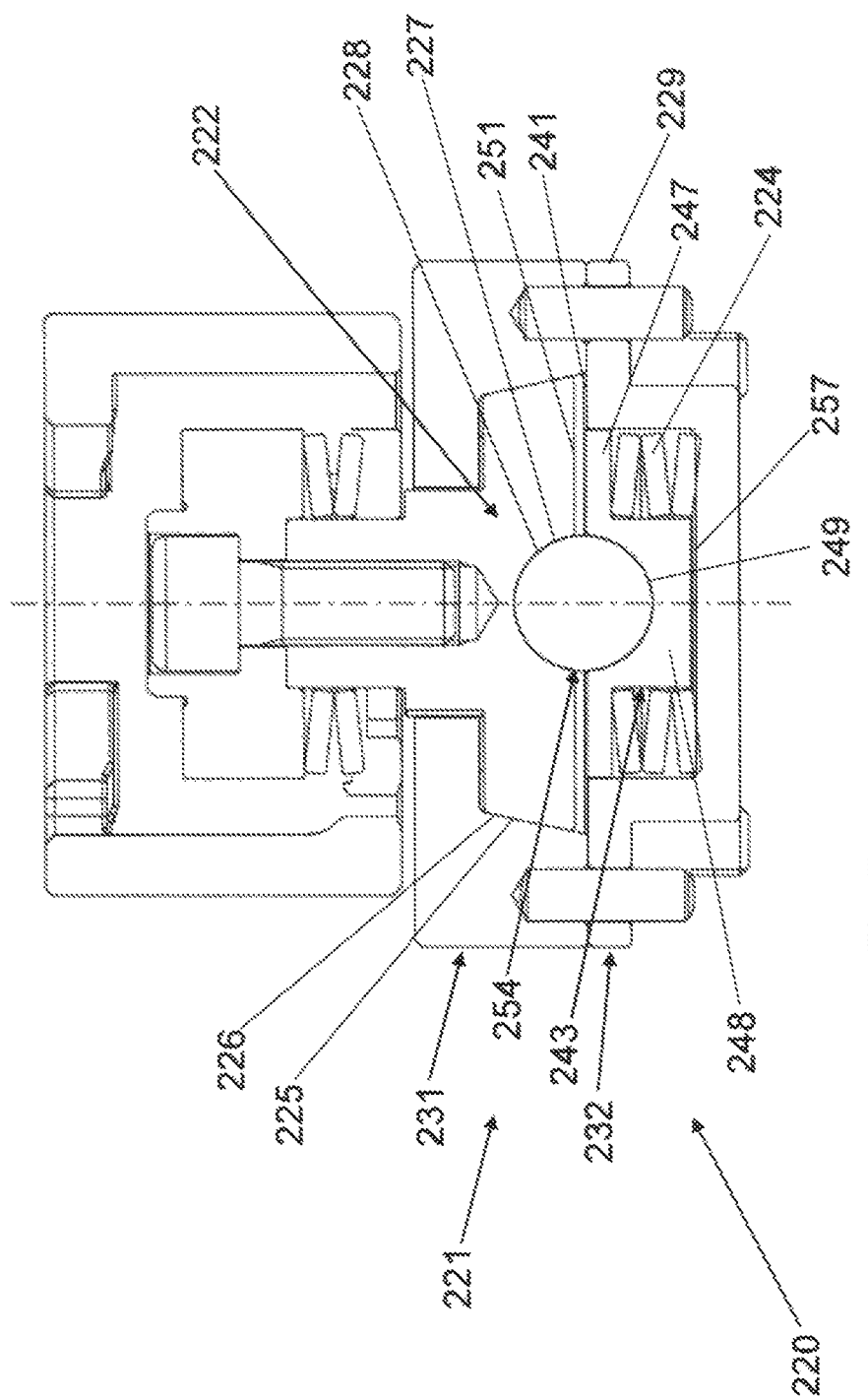
FIG. 7 shows a section view of another variant of the invention.

In a second variant, shown in FIG. 7, the first part 221 of the joint 220, in addition to the upper body 231 and lower body 232, further comprises an additional body 243 and a spherical body 254. As an alternative to the spherical body 254, a cylindrical body may be provided, the longitudinal axis of which is arranged perpendicularly to the axis Y.

The body 243 is arranged between the lower body 232 and the second part 222 of the joint 220.

The spherical body 254 is arranged between the body 243 and the second part 222 of the joint 220.

The body 243 has a flange 247 from which a portion 248 extends downwards, the portion 248 having an outer side surface which is preferably cylindrical. The outer diameter of the flange 247 is greater than the outer diameter of the portion 248.

The portion 248 is preferably a lower central portion.

The lower body 232 has a bottom surface 257, which is recessed with respect to the upper surface 241 of the peripheral flange 229 of the lower body 232.

The elastic means 224, which are preferably a Belleville washer, are in contact with the lower surface of the flange 247 and with the bottom surface 257 of the lower body 232, and are arranged around the portion 248.

The upper surface of the body 243 centrally comprises a spherical cap-shaped surface 249, which is recessed with respect to the upper surface of the flange 247. The surface 249 is concave upwards.

The lower surface 251 of the second part 222 of the joint 220 centrally comprises a spherical cap-shaped recessed surface 228, arranged at the spherical cap-shaped surface 249 of the body 243. The surface 228 is concave downwards.

The spherical body 254 is partly housed in the recess provided by the spherical cap-shaped surface 228 of the second part 222 of the joint 220, and partly in the recess provided by the spherical cap-shaped surface 249 of the body 243.

The surface 228 and the surface 249 have substantially the same radius of curvature as the spherical body 254. Preferably, the surface 228 and the surface 249 have the same extension, or surface area.

Furthermore, both the surface 228 and the surface 249 may each accommodate less than half of the entire surface of the spherical body 254. Therefore, a clearance is provided between the body 243 and the second part 222 of the joint 220. In addition, a clearance is provided between the upper surface 241 of the peripheral flange 229 and the second part 222 of the joint 220. In particular, a clearance is provided between the lower surface 251 of the second part of the joint 220 and the upper surface 241 of the peripheral flange 229.

In the first configuration of the joint 220, the Belleville washer 224 is pre-compressed and pushes the body 243 upwards, which in turn pushes the spherical body 254 upwards, which in turn pushes the second part 222 of the joint 220 upwards. Therefore, the contact between the frustoconical surface 225 and the frustoconical surface 226 is ensured.

In the second configuration of the joint 220, the spherical cap-shaped surface 228 can slide over the surface 227 of the spherical body 254 to rotate the rod 3 with respect to core 5. In particular, in the second configuration, the rod 3 and the core 5 can rotate and translate with respect to each other. In this second configuration of the joint 220, preferably only in this configuration, the body 243 abuts against the bottom surface 257 of the lower body 232.

Figure 8:
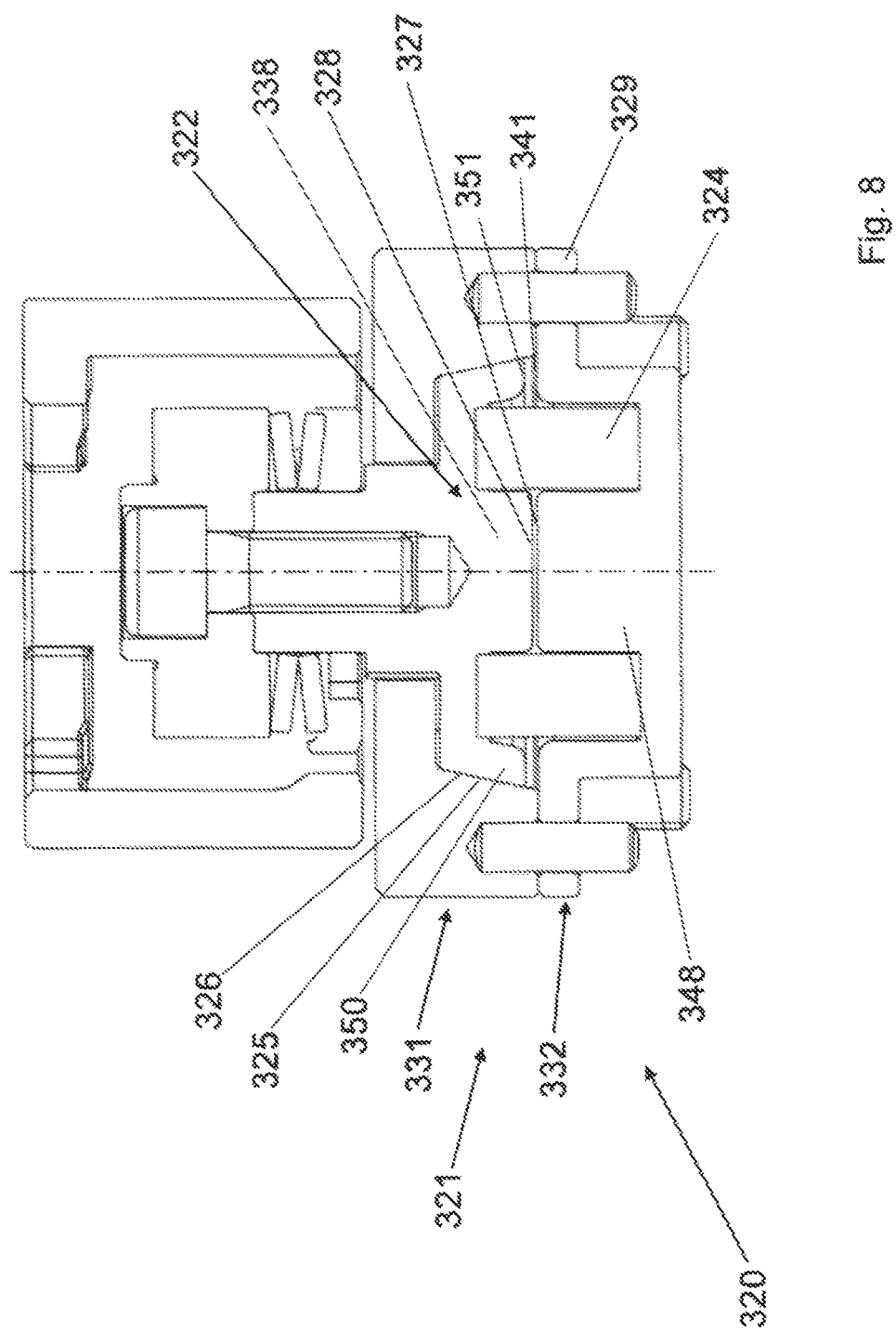
FIG. 8 shows a section view of another variant of the invention.

In a third variant, shown in FIG. 8, the upper body of the first part 321 of the joint 320 is indicated by reference numeral 331, and the lower body 332 comprises an annular housing between the peripheral flange 329 and a central portion 348. The central portion 348 has a side surface, preferably cylindrical, and an upper surface 327.

The annular housing is recessed with respect to the upper surface 341 of the peripheral flange 329 and with respect to the upper surface 327 of the central portion 348.

The second part 322 of the joint 320 comprises a central portion 338 which has a cylindrical outer side surface and a lower surface 328.

The second part 322 of the joint 320 further comprises a peripheral portion 350 which comprises the frustoconical surface 326.

An annular housing is provided between the peripheral portion 350 and the central cylindrical portion 338, which annular housing is recessed with respect to the lower surface 328 of the central part 338 and with respect to the lower surface 351 of the peripheral portion 350.

The annular housing of the second part 322 of the joint 320 is at the annular housing of the lower body 332.

The elastic means 324 are arranged partly in the annular housing of the second part 322 of the joint 320 and partly in the annular housing of the lower body 332. In particular, the elastic means 324 are in contact with the lower surface of the annular housing of the second part 322 of the joint 320 and with the bottom surface of the annular housing of the lower body 332. Also, the elastic means 324 surround the central portion 338 and the central portion 348.

The elastic means 324 are preferably elastomeric means. For example, an elastomer ring can be provided.

The lower surface area 328 of the central portion 338 is preferably curved with upward concavity.

The upper surface area 327 of the central part 348 is preferably flat.

The lower surface 328 faces the upper surface 327.

A clearance is provided between the upper surface 341 of the peripheral flange 329 and the second part 322 of the joint 320. In particular, a clearance is provided between the lower surface 351 of the peripheral portion 350 and the upper surface 341 of peripheral flange 329.

In the first configuration of the joint 320, the elastic means 324 are pre-compressed and push the second part 322 of the joint 320 upwards. Therefore, the contact between the frustoconical surface 325 and the frustoconical surface 326 is ensured. Furthermore, the surfaces 327 and 328 are mutually spaced apart. In the second configuration of the joint 320, the lower surface 328 of the second part of the 320 is in contact with the upper surface 327 of the lower body 332 to facilitate the inclination of the rod 3 with respect to the core 5. In particular, in the second configuration, the rod 3 and the core 5 can both rotate and translate with respect to each other.

Figure 9:
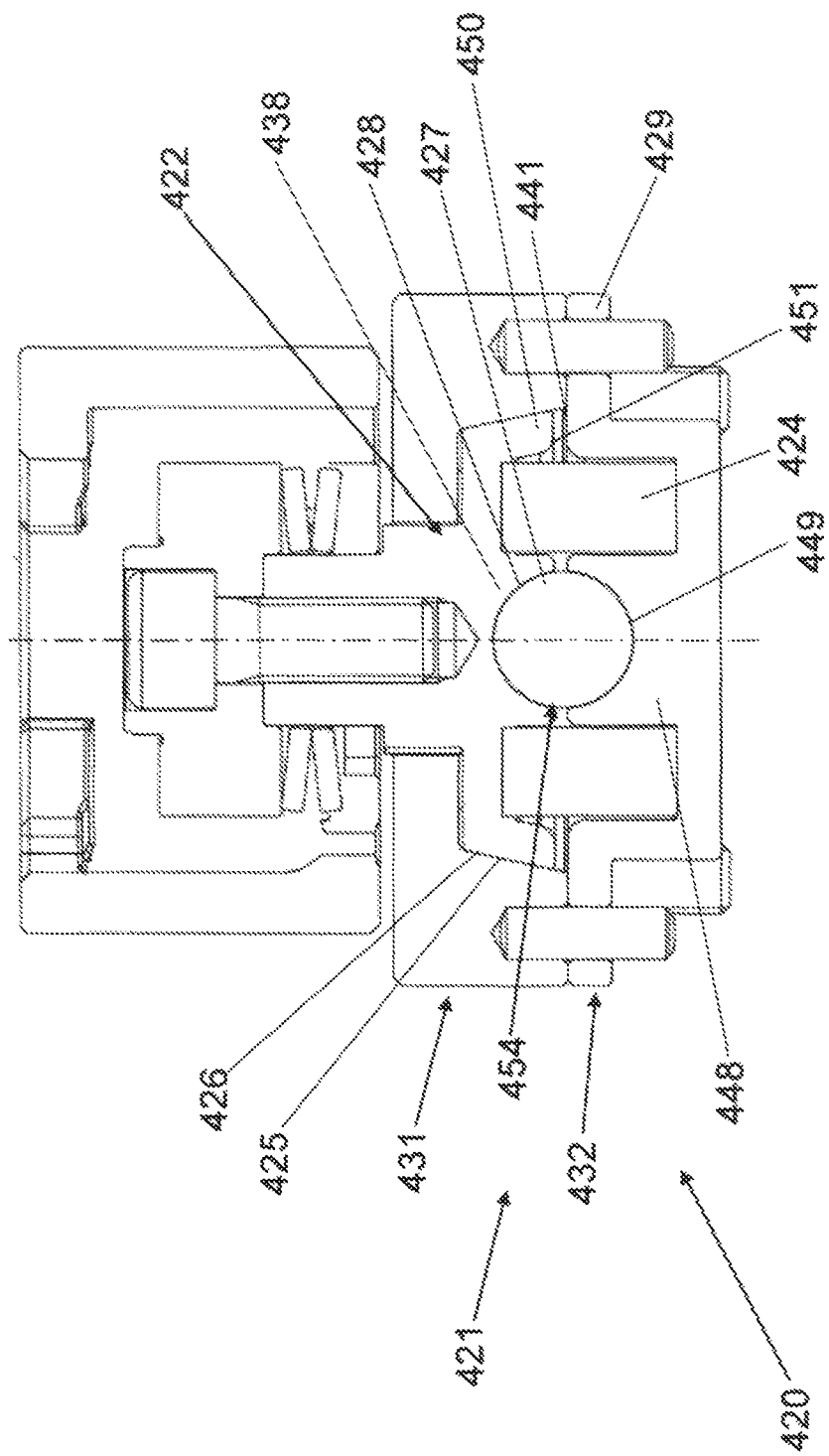
FIG. 9 shows a section view of another variant of the invention.

In a fourth variant, shown in FIG. 9, the first part 421 of the joint 420 comprises a spherical body 454 arranged between the lower body 432 and the second part 422 of the joint 420. As an alternative to the spherical body 454, a cylindrical body may be provided, the longitudinal axis of which is arranged perpendicularly to the axis Y.

The upper body of the first part 421 of the joint 420 is indicated by reference numeral 431, and the lower housing 432 comprises an annular housing or recess between the peripheral flange 429 and a central portion 448. The central portion 448 has a side surface, preferably cylindrical. Furthermore, the central portion 448 has a centrally recessed, spherical cap-shaped surface 449, which is concave upwards. The maximum depth of the surface 449 along the longitudinal axis Y is smaller than the depth along the longitudinal axis Y of the annular housing of the lower body 432.

The second part 422 of the joint 420 comprises a peripheral portion 450 comprising the frustoconical surface 426.

The second part 422 of the joint 420 further comprises a central portion 438 having a cylindrical outer side surface.

The central portion 438 has a centrally recessed, spherical cap-shaped surface 428. The lower surface 428 is concave downwards, and is arranged at the spherical cap-shaped surface 449 of the second part 422 of the joint 420.

The spherical body 454 is partly housed in the recess provided by the spherical cap-shaped surface 428 of the second part 422 of the joint 420, and partly in the recess provided by the spherical cap-shaped surface 449 of the lower body 432.

The surface 428 and the surface 449 have the same radius of curvature as spherical body 454. Preferably, the surface 428 and the surface 449 have the same extension, or surface area.

Furthermore, both the surface 428 and the surface 449 can each accommodate less than half of the entire surface of the spherical body 454. Therefore, there is a clearance between the central portion 438 and the central portion 448. In particular, there is a clearance between the edges of the central portion 438 and of the central portion 448 which surround the surface 428 and the surface 449, respectively.

In addition, a clearance is provided between the upper surface 441 of the peripheral flange 429 and the second part 422 of the joint 420. In particular, a clearance is provided between the lower surface 451 of peripheral portion 450 and the upper surface 441 of peripheral flange 429.

An annular housing is provided between the peripheral portion 450 and the central portion 438.

Such an annular housing of the second part 422 of the joint 420 is at the annular housing of the lower body 432.

The elastic means 424 are arranged partly in the annular housing of the second part 422 of the joint 420 and partly in the annular housing of the lower body 432. In particular, the elastic means 424 are in contact with the lower surface of the annular housing of the second part 422 of the joint 420 and with the bottom surface of the annular housing of the lower body 432. In addition, the elastic means 424 surround the central portion 438 and the central portion 448.

The elastic means 424 are preferably elastomeric means. For example, an elastomer ring can be provided.

In the first configuration of the joint 420, the elastic means 424 are pre-compressed and push the second part 422 of the joint 420 upwards. Therefore, the contact between the frustoconical surface 425 and the frustoconical surface 426 is ensured.

In the second configuration of the joint 420, the spherical cap-shaped surface 428 can slide over the surface 427 of the spherical body 454 to rotate the rod 3 with respect to core 5. In particular, in the second configuration, the rod 3 and the core 5 can rotate and translate with respect to each other.

Figure 10:
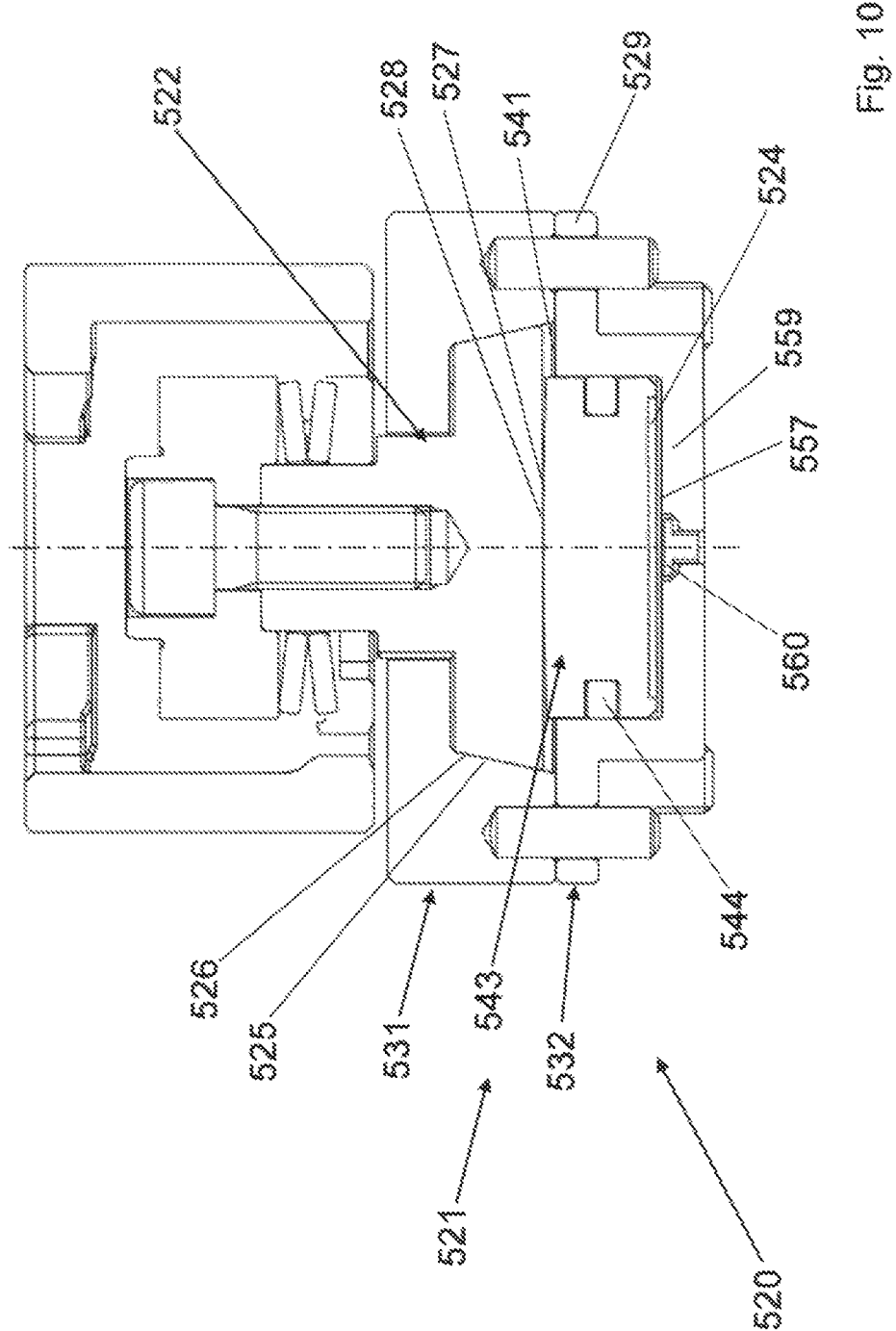
FIG. 10 shows a section view of another variant of the invention.

In a fifth variant, illustrated in FIG. 10, the first part 521 of joint 520, in addition to the upper body 531 and lower body 532, also includes an additional body 543. The body 543 is arranged between the lower body 532 and the second part 522 of the joint 520. In particular, the body 543 is partially arranged in a recess, with respect to the upper surface 541 of the peripheral flange 529 of the lower body 532. The outer side surface of the body 543 faces the inner side surface of the recess of the lower body 532 in which the body 543 is arranged.

The lower surface of body 543 has a recess, which delimits above the air chamber 524 described below. The upper surface 527 of body 543 is preferably curved, with downward concavity.

The lower surface 528 of the second part 522 of the joint 520 is preferably flat.

The upper surface 527 of the body 543 is at a higher height than the upper surface 541 of the peripheral flange 529. Furthermore, the upper surface 527 of the body 543 is preferably always in contact with the central part of the lower surface 528 of the second part 522 of the joint 520. A clearance is provided between the peripheral part of the lower surface 528 and the upper surface 541 of the peripheral flange 529 of the lower body 532.

The lower body 532 has a bottom wall 559 which defines a bottom surface 557 above.

An opening is provided in the bottom wall 559 of the lower body 532, in which a valve 560 for the introduction of compressed air is inserted.

In this variant, the elastic means comprise or consist of an air spring, and the body 543 is substantially a piston.

In particular, between the bottom surface 557 and the lower surface of the body 543 there is a chamber in which there is a pressurized gas, preferably an air chamber 524. Preferably, the valve 560 is of the unidirectional type, i.e. it only allows air to enter the air chamber 524. The air chamber 524 is in communication by means of the valve 560 with means adapted to introduce an air flow or other gas into the chamber 524.

For example, the air chamber 524 is in communication with the compression chamber underneath (not shown) of the injection-compression device 1 by means of the valve 560. The pressure inside the compression chamber is quite high. For example, the compression chamber may be fed at a pressure between 10 and 50 bars, e.g. about 38 bars. Therefore, any air leaks from chamber 524 are compensated by the air coming from the compression chamber, so that permanence of the elastic force is ensured. To limit air leaks, the outer side surface of the body 543 comprises a housing, in particular a recess, in which a seal 544 is housed.

In the first configuration of the joint 520, the air chamber 524 applies a pressure on the body 543, whereby pushing it upwards. The body 543, in turn, pushes the second part 522 of the joint 520 upwards. Therefore, the contact between the frustoconical surface 525 and the frustoconical surface 526 is ensured.

In the second configuration of the joint 520, the lower surface 528 of the second part 522 of the joint 520 is in contact with the upper surface 527 of the body 543 to rotate the rod 3 with respect to the core 5. In particular, in the second configuration, the rod 3 and the core 5 can both rotate and translate with respect to each other. In this second configuration of the joint 520, the body 543 abuts against the bottom surface 557 of the lower body 532.

Figure 11:
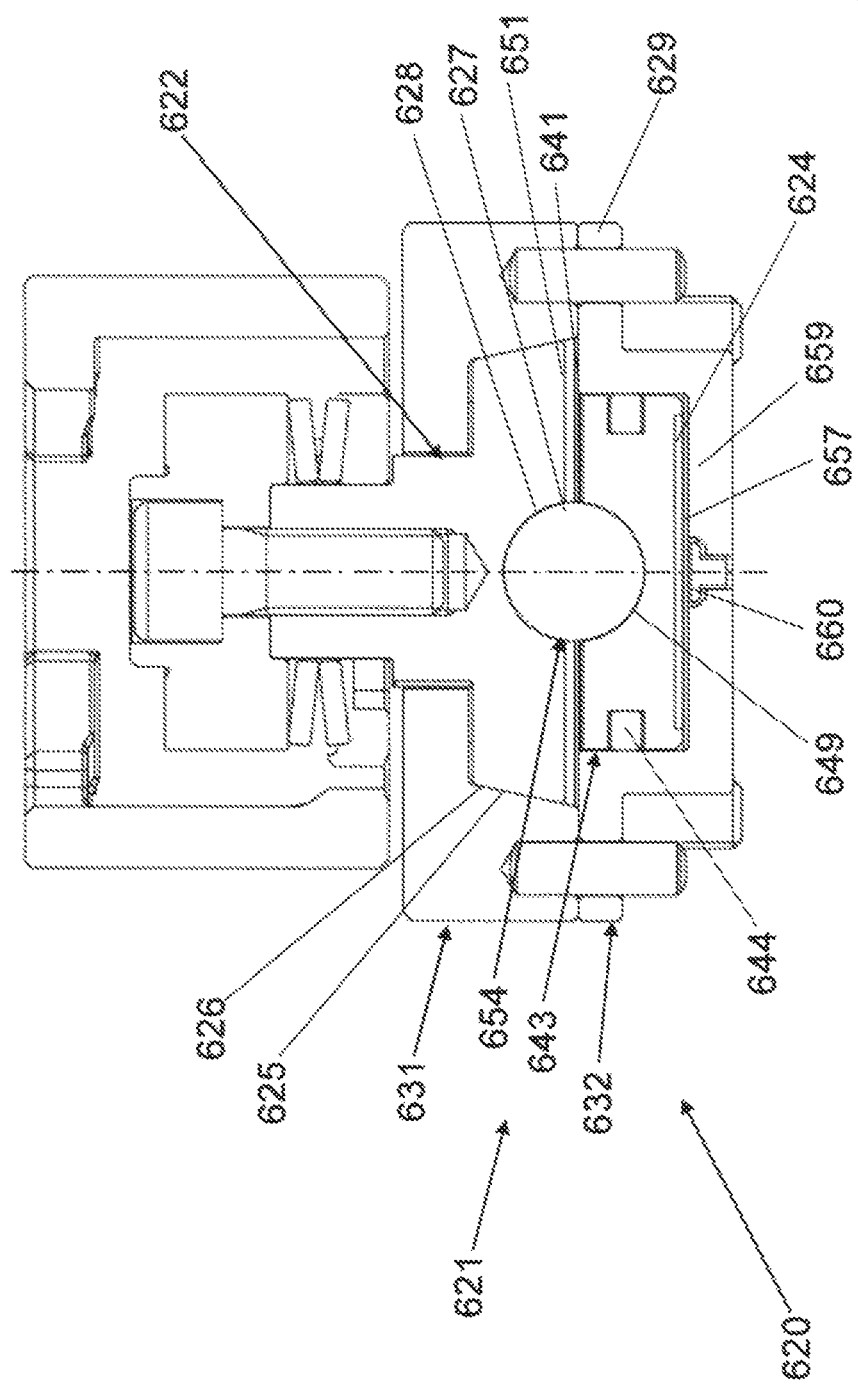
FIG. 11 shows a section view of another variant of the invention.

In a sixth variant, shown in FIG. 11, the first part 621 of the joint 620, in addition to the upper body 631 and lower body 632, further comprises an additional body 643 and a spherical body 654. As an alternative to the spherical body 654, a cylindrical body may also be provided, the longitudinal axis of which is perpendicular to the axis Y.

The body 643 is arranged between the lower body 632 and the second part 622 of the joint 620. In particular, the body 643 is partially arranged in a recess, with respect to the upper surface 641 of the peripheral flange 629 of the lower body 632. The outer side surface of the body 643 faces the inner side surface of the recess of the lower body 632 in which the body 643 is arranged.

The lower surface of body 643 has a recess, which delimits above an air chamber 624 described below.

The upper surface 643 centrally comprises a spherical cap-shaped surface 649. The surface area 649 is concave upwards.

The lower surface 651 of the second part 622 of the joint 620 centrally comprises a spherical cap-shaped surface 628, arranged at the spherical cap-shaped surface 649 of the body 643. The surface 628 is concave downwards.

The spherical body 654 is partly housed in the recess provided by the spherical cap-shaped surface 628 of the second part 622 of the joint 620, and partly in the recess provided by the spherical cap-shaped surface 649 of the body 643.

The surface 628 and the surface 649 have the same radius of curvature as spherical body 654. Preferably, the surface 628 and the surface 649 have the same extension, or surface area.

Furthermore, both the surface 628 and the surface 649 may each accommodate less than half of the entire surface of the spherical body 654. Therefore, a clearance is provided between the body 643 and the second part 622 of the joint 620. In addition, a clearance is provided between the upper surface 641 of the peripheral flange 629 and the second part 622 of the joint 620. In particular, a clearance is provided between the lower surface 651 of the second part of the joint 620 and the upper surface 641 of the peripheral flange 629.

The lower body 632 has a bottom wall 659 which defines a bottom surface 657 above.

An opening is provided in the bottom wall 659 of the lower body 632, in which a valve 660 for the introduction of compressed air is inserted.

In this variant, the elastic means 624 are provided by an air spring, and the body 643 is substantially a piston.

In particular, between the bottom surface 657 and the lower surface of the body 643 there is an air chamber 624. The air chamber 624 is in communication by means of the valve 660 with means adapted to introduce an air flow or other gas into the chamber 624.

For example, the air chamber 624 is in communication with compression chamber underneath (not shown) of the injection-compression device 1 by means of the valve 660, as described above for the fifth variant. Also in this sixth variant, in order to limit air leaks, the outer side surface of body 643 comprises a housing, in particular a recess, in which a seal 644 is housed.

In the first configuration of the joint 620, the air chamber 624 applies a pressure on the body 643, whereby pushing it upwards. The body 643, in turn, pushes the spherical body 654 upwards, which, in turn, pushes the second part 622 of the joint 620 upwards. Therefore, the contact between the frustoconical surface 625 and the frustoconical surface 626 is ensured.

In the second configuration of the joint 620, the spherical cap-shaped surface 628 of the second part 622 of the joint 620 can slide on the surface 627 of the spherical body 254 to rotate the rod 3 with respect to core 5. In particular, in the second configuration, the rod 3 and the core 5 can rotate and translate with respect to each other. In this second configuration of the joint 620, the body 643 abuts against the bottom surface 657 of the lower body 632.

Figure 13:
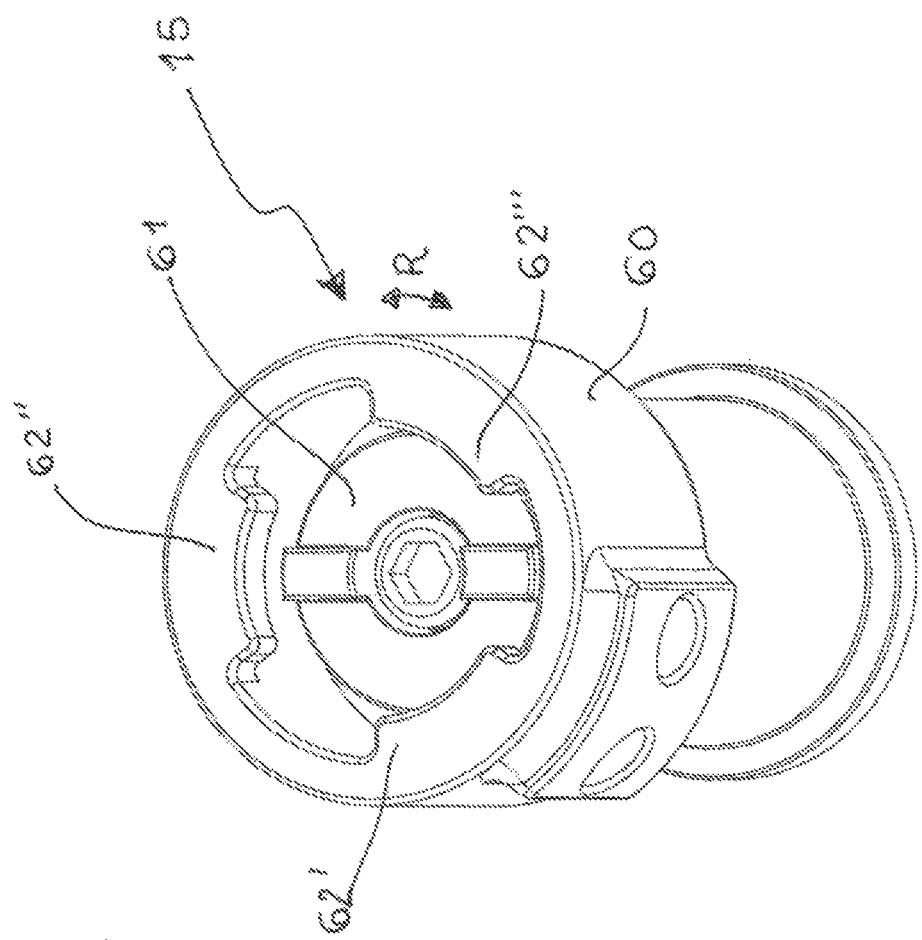
FIG. 13 shows another perspective view of the components in FIG. 12.
Figure 12:
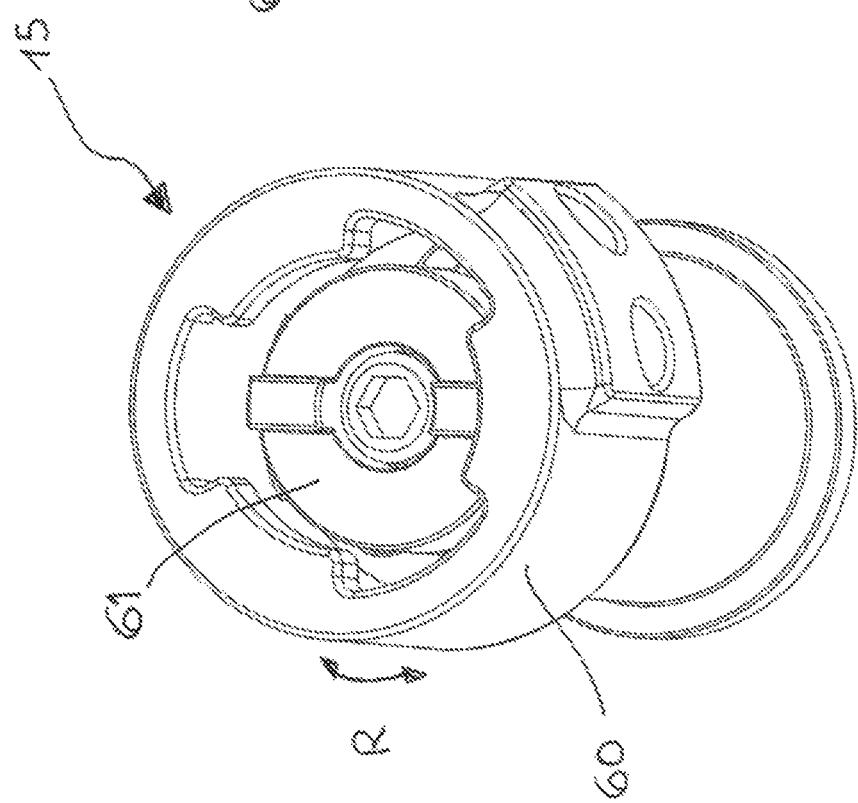
FIG. 12 shows a perspective view of a possible component of a device according to the invention.

In all the embodiments, the rod 3 is preferably fixed to the joint 20 by means of a bayonet coupling 15. FIGS. 12 and 13 show two perspective views of the bayonet coupling 15, respectively. A section of the bayonet coupling 15 is shown, for example, in FIG. 5A.

The bayonet coupling 15 comprises a sleeve 60 arranged about an engaging base 61 with a constraint which allows an angular rotation thereof about the axis X and about the engaging base 61, but is integral in the direction parallel to the axis X with the engaging base 61.

The engaging base 61 is centrally provided with a hole, in which the screw 69 is inserted, by means of which the bayonet coupling 15 is integrally fixed to joint 20, in particular to the second part 22 thereof.

The sleeve 60 is provided with teeth 62', 62'', 62''' directed towards the inside of its cavity, which are shaped to fit into corresponding grooves (not shown) of the rod 3 and to slide into an annular groove of the rod 3 with a relative rotation between rod 3 and sleeve 60, e.g. about 60°, in the direction of the arrow R. Therefore, the rod 3 can be quickly attached to and detached from the bayonet coupling 15 for performing assembly/disassembly operations, maintenance or format change of the preforms to be molded.

Preferably, a Belleville washer 68 is provided in the bayonet coupling 15 (shown for example in FIG. 5A), or other elastic means, which contributes to the fastening between the bayonet coupling 15 and the rod 3. In particular, when pushed by the Belleville washer 68, a lower portion of the rod 3 is held fitted between teeth 62', 62'', 62''' and the engaging base 61.

Preferably, the molding device 1 is part of an injection-compression molding machine or apparatus. Such a machine indeed comprises a plurality of molding devices 1. Preferably, such a machine is of the rotary type.

The invention claimed is:

1. An injection-compression molding device for producing bottle preforms, comprising:
   a frame;
   at least one molding cavity fixed to the frame;
   at least one rod, connected to the frame so as to be capable of sliding with respect thereto;
   at least one core, connected to the at least one rod so as to be capable of sliding therewith, adapted to be inserted into the at least one molding cavity defining a mold;
   actuation means adapted to exert a mold closing force when the at least one core is inserted into the at least one molding cavity;
   a joint connecting the at least one core to the at least one rod, wherein said joint comprises
   a first part integrally connected and coaxial to said at least one core and defining a joint cavity;
   a second part integrally connected and coaxial to said at least one rod and at least partially slidable within said joint cavity when the mold closing force is applied;
   elastic means arranged in said joint cavity between the first and second parts and configured to enable movement of the second part with respect to the first part;
   said first part being provided with an inner side surface;
   said second part being provided with an outer side surface;
   wherein, in a first configuration of the joint without the mold closing force being exerted, the outer side surface is kept in contact with the inner side surface by the bias of said elastic means, such that the at least one rod and the at least one core are kept coaxial with respect to each other; and wherein in a second configuration of the joint with the mold closing force being exerted, said second part is translated with respect to the first part so that said elastic means is pressed by the second part so that a clearance is provided between the outer side surface and the inner side surface, such that the at least one rod can tilt to a non-coaxial position with respect to the at least one core.

2. The molding device according to claim 1, wherein said inner side surface is frustoconical in shape and defines a central axis coinciding with the longitudinal axis Y of the at least one core, and wherein said outer side surface is frustoconical in shape and defines a central axis coinciding with the longitudinal axis X of the at least one rod.

3. The molding device according to claim 2, wherein in the first configuration, the inner side surface and the outer side surface are parallel and coaxial to each other; and in the second configuration, the inner side surface and the outer side surface are inclined with respect to each other, whereby the central axes thereof are inclined with respect to each other.

4. The molding device according to claim 2, wherein said outer side surface has a height which is lower than the height of said inner side surface, and wherein, in the first configuration, the inner side surface and the outer side surface are tapered towards the at least one rod.

5. The molding device according to claim 2, wherein the inner side surface forms a first angle with the respective central axis; wherein the outer side surface forms a second angle with the respective central axis; wherein the first angle is equal to the second angle, and wherein said first angle has a value from 10° to 30°.

6. The molding device according to claim 1, wherein the first part has a first surface; wherein the second part has a second surface facing said first surface of the first part; wherein at least one of said first surface and said second surface is curved, and wherein in said second configuration, the first surface and the second surface are in contact to rotate said at least one rod and said at least one core with respect to each other.

7. The molding device according to claim 1, wherein the elastic means are arranged between the first part and the second part of the joint, and wherein the elastic means comprise a Belleville washer, an elastomeric ring, or an air spring.

8. The molding device according to claim 1, wherein the first part of the joint comprises an upper body and a lower body fastened to each other by a fastener.

9. The molding device according to claim 8, wherein the second part of the joint has a peripheral portion comprising said outer side surface and a lower surface; wherein the lower body comprises an upper surface; and wherein a clearance is provided between said lower surface of the second part and said upper surface of the first part.

10. The molding device according to claim 1, wherein the at least one rod includes two or more rods and the at least one core includes two or more cores, each rod and each core being connected to each other by means of a respective joint.

11. The molding apparatus comprising a plurality of molding devices according to claim 1.

12. The molding device according to claim 1, wherein the second part includes a lower portion that is configured as a yoke to interface with the elastic means arranged in said joint cavity.

13. The molding device according to claim 1 further comprising a coupling securing a distal end of the rod to the second part.

14. The molding device according to claim 13, wherein a gap is formed between a lower portion of the coupling and an upper surface of the first part.

15. The molding device according to claim 13, wherein the coupling is a bayonet coupling fixedly attached to the second part.

16. The molding device according to claim 13, wherein the coupling is fixedly attached to the second part via a fastener.

17. The molding device according to claim 1, wherein first part, which is integrally connected and coaxial to said at least one core, includes an upper portion and a lower portion which define the joint cavity therebetween;

the second part, which is integrally connected and coaxial to said at least one rod, is positioned between the upper and lower portions of the first part; and the elastic means is arranged between a lower surface of the second part and an upper surface of the lower portion of the first part.

18. The molding device according to claim 17, wherein elastic means is a spring.

* * * * *